(12) United States Patent
Kira

(10) Patent No.: US 11,897,093 B2
(45) Date of Patent: Feb. 13, 2024

(54) NUT TEMPORARY TIGHTENING DEVICE

(71) Applicant: TOYOTA JIDOSHA KABUSHIKI KAISHA, Toyota (JP)

(72) Inventor: Kazuhiko Kira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 17/409,114

(22) Filed: Aug. 23, 2021

(65) Prior Publication Data

US 2022/0063064 A1  Mar. 3, 2022

(30) Foreign Application Priority Data

Aug. 28, 2020 (JP) ................................ 2020-144427

(51) Int. Cl.
*B25B 17/00* (2006.01)
*B25B 23/10* (2006.01)

(52) U.S. Cl.
CPC ............ *B25B 17/00* (2013.01); *B25B 23/108* (2013.01)

(58) Field of Classification Search
CPC ......... B25B 13/48; B25B 17/00; B25B 21/00; B25B 23/00; B25B 23/02; B25B 23/08; B25B 23/18; B25B 23/108; B60B 29/00; B60B 29/005; B23P 19/06; B23P 19/067; B23P 19/069; B23P 19/08; B23P 19/10
See application file for complete search history.

(56) References Cited

U.S. PATENT DOCUMENTS

| 5,074,170 A * | 12/1991 | Shirley ................. | B23P 19/069 |
| | | | 74/606 R |
| 6,134,989 A * | 10/2000 | Stevens ................. | B23P 19/069 |
| | | | 81/57.36 |
| 2002/0117027 A1 * | 8/2002 | Boston ................. | B60B 29/002 |
| | | | 81/57.22 |
| 2018/0085871 A1 | 3/2018 | Kira | |

FOREIGN PATENT DOCUMENTS

| JP | 10-230425 A | 9/1998 |
| JP | WO 2012/176032 | * 12/2012 |
| JP | 2013-000871 A | 1/2013 |
| JP | 2018-012155 A | 1/2018 |
| JP | 2018012155 | * 1/2018 |
| JP | 2018-051637 A | 4/2018 |
| JP | 2019-188515 A | 10/2019 |
| WO | 2012/176032 A1 | 12/2012 |

* cited by examiner

*Primary Examiner* — Robert J Scruggs
(74) *Attorney, Agent, or Firm* — Sughrue Mion, PLLC

(57) ABSTRACT

A nut temporary tightening device has bearing parts, a first support plate, a second support plate, and socket assemblies. Each bearing part has a cylindrical sleeve extending in an up-down direction and a flange provided at an intermediate portion of the sleeve. The first support plate has a plurality of first support holes that each support a corresponding bearing part along the outer circumference, on an upper end side, of the bearing part. The second support plate has a plurality of second support holes that each support a corresponding bearing part along the outer circumference, on a lower end side, of the bearing part. Each socket assembly has a driving shaft, a driving part, and a socket.

6 Claims, 12 Drawing Sheets

NUT TEMPORARY TIGHTENING DEVICE

CROSS-REFERENCE TO RELATED APPLICATION

This application claims priority to Japanese Patent Application No. 2020-144427 filed on Aug. 28, 2020, incorporated herein by reference in its entirety.

BACKGROUND

1. Technical Field

The disclosure relates to a nut temporary tightening device.

2. Description of Related Art

Among devices for mounting nuts, there are known multi-shaft tools that mount a plurality of nuts at the same time. Workpieces that are objects to be worked on by multi-shaft tools sometimes vary in a shaft pitch between shafts onto which nuts are to be mounted. To deal with such cases, a technique for adapting to workpieces with different shaft pitches has been proposed. For example, a shaft pitch adjustable device in which the shaft pitch of nut runners is changed by replacing a part of the device has been disclosed (Japanese Unexamined Patent Application Publication No. 10-230425).

SUMMARY

However, the above technique involves the trouble of replacing a part of the device. Thus, the work efficiency decreases when the shaft pitch differs due to variation among workpieces.

Having been contrived to solve this problem, the disclosure provides a nut temporary tightening device that can absorb variation in shaft pitch and temporarily tighten a plurality of nuts at the same time.

A nut temporary tightening device according to the disclosure has bearing parts, a first support plate, a second support plate, and socket assemblies. Each bearing part has a cylindrical sleeve extending in an up-down direction and a flange provided at an intermediate portion of the sleeve. The first support plate has a plurality of first support holes that each support a corresponding bearing part along the outer circumference, on an upper end side, of the bearing part. The second support plate is fixed under the first support plate at a distance greater than the thickness of the flange so as to face and be parallel to the first support plate, and has a plurality of second support holes that each supports a corresponding bearing part along the outer circumference, on a lower end side, of the bearing part. Each socket assembly has a driving shaft, a driving part, and a socket. The driving shaft is passed through a corresponding bearing part that is supported such that the flange is loosely fitted in the up-down direction between the first support plate and the second support plate. The driving part is provided at a portion of the driving shaft protruding toward the upper end side. The socket is provided to be able to hold a nut at a leading end of the driving shaft protruding toward the lower end side.

Thus, when the positions of workpieces onto which nuts are to be temporarily tightened vary, this nut temporary tightening device can absorb this variation.

In the above nut temporary tightening device, the first support holes of the first support plate may be disposed in a linear arrangement, and the second support holes of the second support plate may be disposed in a linear arrangement at positions corresponding to the first support holes. Thus, this nut temporary tightening device makes it easy to work on a workpiece in which bolts are linearly arranged.

In the above nut temporary tightening device, the first support plate may have elongated holes as the first support holes, and a long-side direction of each of the elongated holes may extend along a direction in which the first support holes are disposed. The second support plate may have elongated holes corresponding to the first support holes as the second support holes. Thus, this nut temporary tightening device can appropriately absorb a cumulative tolerance of bolts that are linearly arranged.

In the above nut temporary tightening device, at least one pair of corresponding holes of the first support holes and the second support holes of the first support plate and the second support plate may be reference holes, and the diameter of the reference holes may be set to be smaller than the diameter of the other first support holes or the diameter of the other second support holes. Thus, this nut temporary tightening device can absorb variation among workpieces.

In the above nut temporary tightening device, the socket belonging to at least one socket assembly among the socket assemblies may be a reference socket, and the position of the reference socket in the up-down direction may be set to be different from the positions of the other sockets. Thus, this nut temporary tightening device allows nuts to be easily fitted onto workpieces and can thereby increase the work efficiency.

The above nut temporary tightening device may further include: an operating part that has an operating gear and a handle above the operating gear and is rotatably fixed on an upper surface of the first support plate; and intermediate gears that are rotatably fixed on the upper surface of the first support plate and transmit rotation of the operating gear to the socket assemblies. The socket assemblies may each include a driving gear that is provided on the outer circumference of the driving shaft and meshes with the intermediate gear. The operating gear of the operating part may be connected to the intermediate gears, and the intermediate gears may be configured such that the driving gears rotate in the same direction and at the same speed. Thus, this nut temporary tightening device allows nuts to be easily temporarily tightened onto a plurality of bolts by a single operation.

In the above nut temporary tightening device, the intermediate gears may each have a gap such that when the driving gear meshing with the intermediate gear moves based on the first support hole and the second support hole, the intermediate gear is able to follow the driving gear and mesh with the driving gear. Thus, this nut temporary tightening device can adapt the sockets to workpieces that vary significantly and can thereby increase the work efficiency.

The disclosure can provide a nut temporary tightening device that can absorb variation in shaft pitch and temporarily tighten a plurality of nuts at the same time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
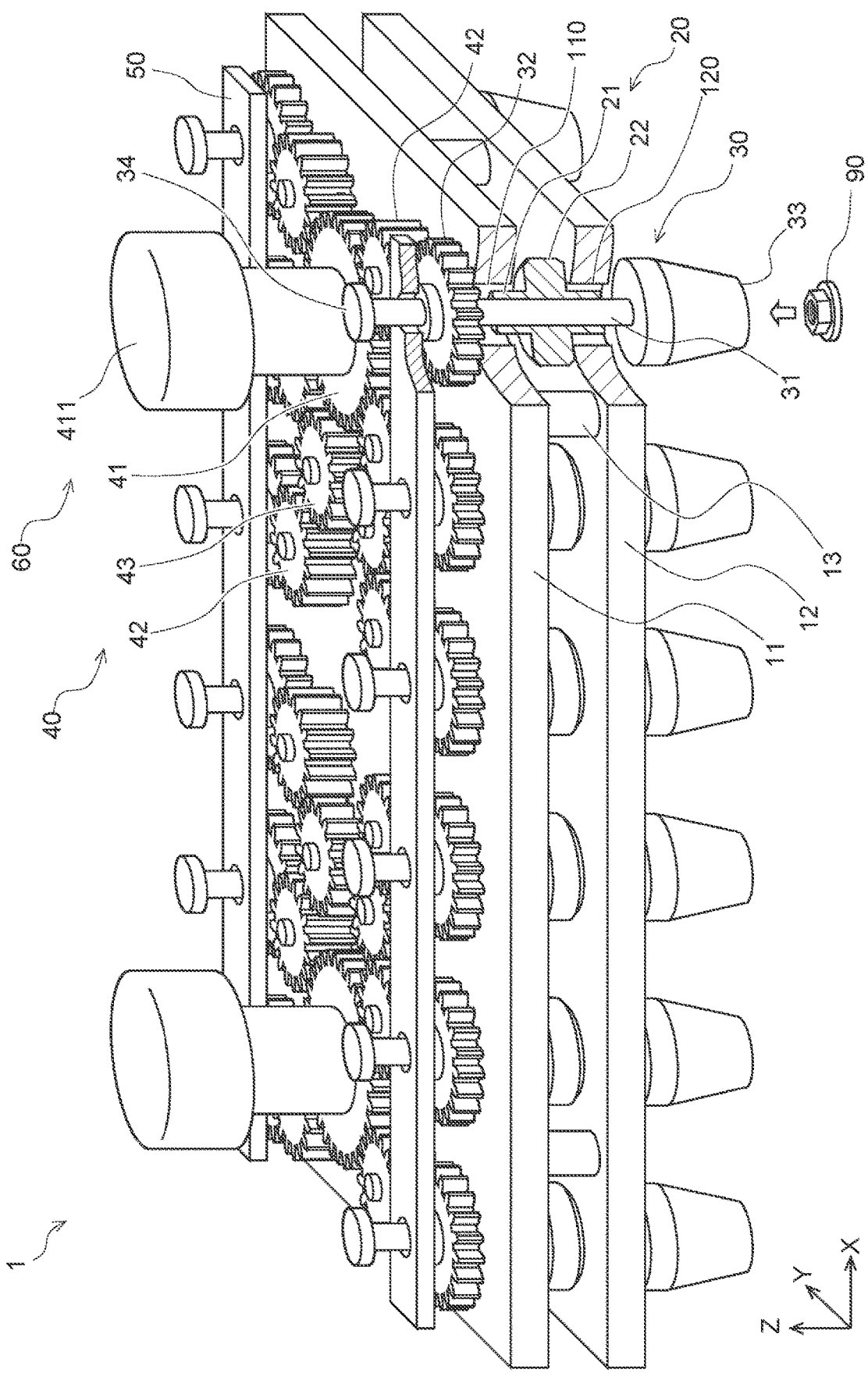
FIG. 1 is a schematic view of a nut temporary tightening device according to Embodiment 1.

The disclosure will be described below through embodiments of the disclosure, but the disclosure according to the claims is not limited to the following embodiments. All components to be described in the embodiments are not necessarily essential as solutions to the problem. To clarify the illustration, the following description and the drawings are partially omitted and simplified as necessary. The same elements in the drawings are denoted by the same reference signs, and an overlapping description will be omitted as necessary.

Embodiment 1

An outline of a nut temporary tightening device 1 according to an embodiment of the disclosure will be described below. FIG. 1 is a schematic view of the nut temporary tightening device according to the embodiment. FIG. 1 shows a state of the nut temporary tightening device 1 as observed from obliquely above. For the convenience of illustration, the nut temporary tightening device 1 shown in FIG. 1 is partially cut away to reveal a section. The nut temporary tightening device 1 according to the embodiment is used for a workpiece having a plurality of bolts disposed thereon in a linear arrangement to temporarily tighten corresponding nuts onto the respective bolts.

Figure 2:
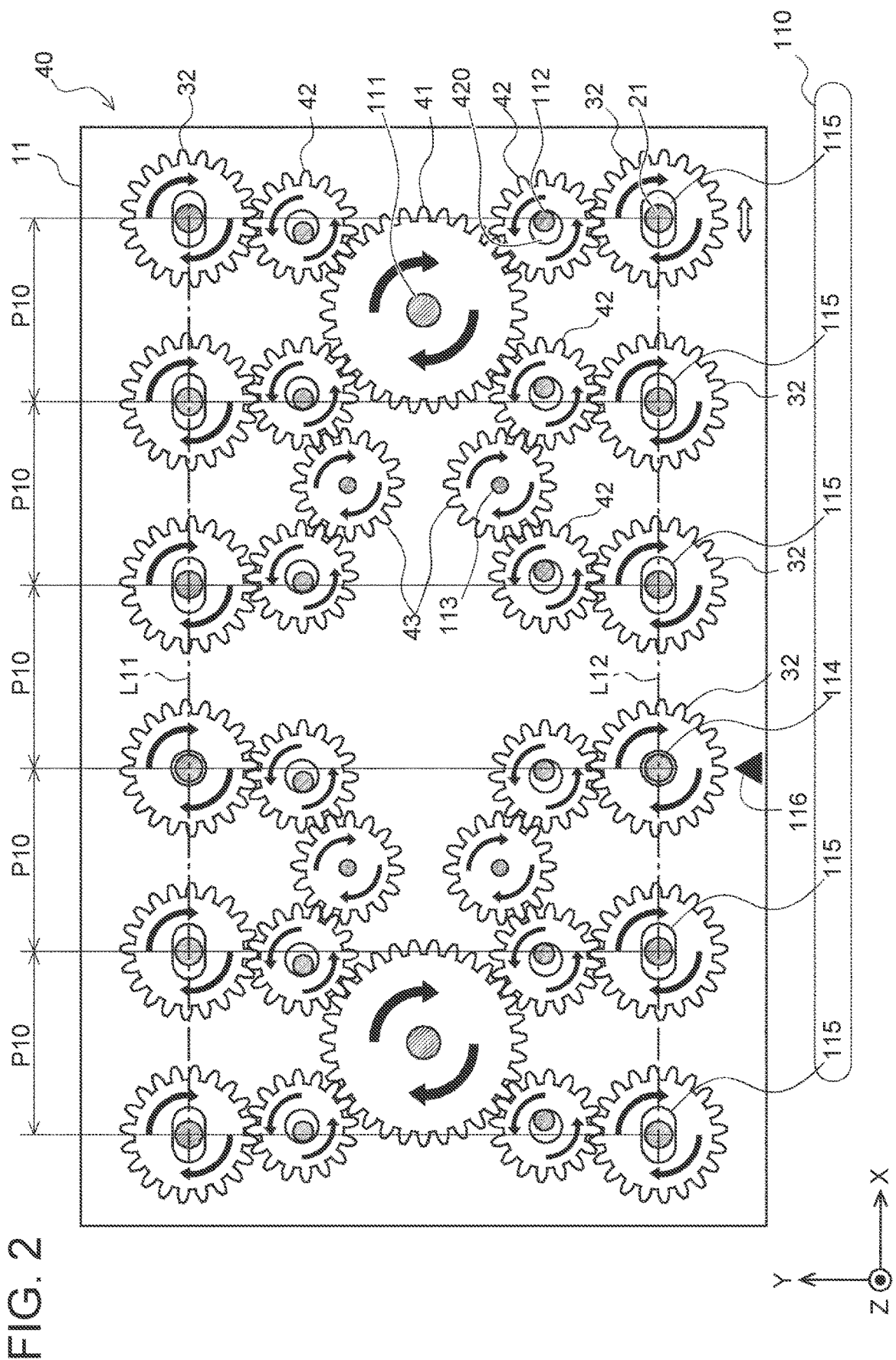
FIG. 2 is a layout plan of a gear group in the nut temporary tightening device.

For the convenience of describing the positional relationships among constituent elements, a right-handed orthogonal coordinate system is indicated in FIG. 1. When an orthogonal coordinate system is indicated in FIG. 2 and the subsequent drawings, the directions of the X-axis, the Y-axis, and the Z-axis in FIG. 1 and the directions of the X-axis, the Y-axis, and the Z-axis of the orthogonal coordinate system respectively correspond to each other. In the description of this embodiment, a "left-right direction," a "front-rear direction," and a "height direction" mean the X-axis direction, the Y-axis direction, and the Z-axis direction, respectively. In the height direction, an upward direction is a Z-axis plus direction and a downward direction is a Z-axis minus direction.

As main components, the nut temporary tightening device 1 has a first support plate 11, a second support plate 12, support plate connecting parts 13, bearing parts 20, socket assemblies 30, a gear group 40, pressing plates 50, and operating parts 60.

The first support plate 11 is a rectangular plate-shaped member that is disposed such that principal surfaces are parallel to a horizontal plane (XY-plane) and serves as a main frame for supporting components of the nut temporary tightening device 1. The gear group 40 is supported on an upper principal surface (upper surface) of the first support plate 11. A lower principal surface (lower surface) of the first support plate 11 faces the second support plate 12 at a distance. The first support plate 11 and the second support plate 12 are fixed to each other through the support plate connecting parts 13. Thus, the first support plate 11 and the second support plate 12 form a predetermined space over a region in which they face each other. In this space, the bearing parts 20 are loosely fitted.

The first support plate 11 has a plurality of first support holes 110 that is holes extending through the first support plate 11 in the up-down direction. Sleeves 21 of the bearing parts 20 that are loosely fitted between the first support plate 11 and the second support plate 12 are inserted into the respective first support holes 110.

The second support plate 12 is a rectangular plate-shaped member similar to the first support plate 11. As shown in FIG. 1, the second support plate 12 has substantially the same outer shape as the first support plate 11. The second support plate 12 is disposed so as to overlap with the first support plate 11 as seen from above or below, and is disposed at such a position on a lower surface side of the first support plate 11 as to face the first support plate 11 at a distance. The second support plate 12 is fixed to the first support plate 11, on the lower surface side of the first support plate 11, through the support plate connecting parts 13. The bearing parts 20 are loosely fitted in the space formed between the first support plate 11 and the second support plate 12.

The second support plate 12 has second support holes 120 that are holes extending through the second support plate 12 in the up-down direction. The second support holes 120 are provided at positions corresponding to the first support holes 110, i.e., under the first support holes 110. The sleeves 21 of the bearing parts 20 that are loosely fitted between the first support plate 11 and the second support plate 12 are inserted into the respective second support holes 120.

As described above, the support plate connecting parts 13 are support members that fix the first support plate 11 and the second support plate 12 to each other at a distance. The support plate connecting parts 13 are provided at arbitrary positions at which they do not hinder the function of the nut temporary tightening device 1, and are fixed to the first support plate 11 and the second support plate 12.

The bearing parts 20 are bearing members that are loosely fitted between the first support plate 11 and the second support plate 12 so as to have a clearance at least in the up-down direction. Each bearing part 20 has the sleeve 21 and a flange 22. The sleeve 21 is a cylindrical sleeve 21 extending in the up-down direction and inserted into the first support hole 110 and the second support hole 120. A driving shaft 31 of the socket assembly 30 is passed through the sleeve 21. The sleeve 21 supports the driving shaft 31 without play so as not to hinder the driving shaft 31 from moving in an axial direction and a radial direction. The flange 22 is a disc-shaped member provided on an outer circumference, at an intermediate portion, of the sleeve 21 so as to be integrated with the sleeve 21. The size of the flange 22 in a horizontal direction is larger than the sizes of the first support hole 110 and the second support hole 120. Therefore, the bearing part 20 does not come out from between the first support plate 11 and the second support plate 12.

Each socket assembly 30 has the driving shaft 31, a driving gear 32, a socket 33, and a fall-prevention part 34. The driving shaft 31 is a shaft member passed through the bearing part 20.

The driving shaft 31 protrudes upward and downward from the bearing part 20 through which it is passed, and has the driving gear 32 on an upper end side and the socket 33 on a lower end side. The driving gear 32 is a member that is provided on the upper end side of the driving shaft 31 so as to be integrated with the driving shaft 31. The driving gear 32 includes a spur gear that is centered on the driving shaft 31 and is orthogonal to the driving shaft 31. When the driving gear 32 is rotated, the driving shaft 31 is also rotated. Thus, the driving gear 32 can be said to be one aspect of a driving part that drives the socket assembly 30.

The pressing plates 50 are loosely fitted on the driving shafts 31 above the driving gears 32. When the pressing plates 50 are pressed downward, the driving gears 32 are pressed downward by the pressing plates 50. Each driving shaft 31 has the fall-prevention part 34 provided at a portion protruding above the pressing plate 50. The fall-prevention part 34 is a member that is provided at a leading end, on the upper end side, of the driving shaft 31 so as to prevent the pressing plate 50 from coming off, and is a nut, a retaining ring, or the like having a larger diameter than a hole provided in the pressing plate 50.

While all the driving shafts 31 of the socket assemblies 30 shown in FIG. 1 have the fall-prevention part 34, all the socket assemblies 30 do not need to have the fall-prevention part 34. For example, the socket assemblies 30 located at both ends of each pressing plate 50 that is loosely fitted across the socket assemblies 30 may have the fall-prevention part 34 while the socket assemblies 30 in a middle part may not have the fall-prevention part 34.

The socket 33 is provided to be able to hold a nut 90 at a leading end, on the lower end side, of the driving shaft 31. The socket 33 has, in a lower surface of a resin part of an inverted truncated conical shape, a polygonal recess into which the nut 90 fits, and a magnet that attracts the nut 90 is provided inside the recess. Thus, as the driving shaft 31 rotates, the nut 90 held by the socket 33 rotates.

The gear group 40 is a plurality of gears provided on the upper surface of the first support plate 11. The gear group 40 includes operating gears 41, first intermediate gears 42, and second intermediate gears 43. The gear group 40 will be described in detail later.

The pressing plates 50 are plate-shaped members that are loosely fitted across the socket assemblies 30. Each pressing plate 50 has a plurality of holes, in each of which the driving shaft 31 of the corresponding socket assembly 30 is loosely fitted. The pressing plates 50 are set so as to have play to such an extent that does not hinder the function of the nut temporary tightening device 1 to be described later.

The pressing plates 50 are provided to enable a user to simultaneously press the socket assemblies 30 when the nuts 90 are attracted onto the nut temporary tightening device 1. As the user presses the pressing plates 50, the nut temporary tightening device 1 can simultaneously and reliably attract the nuts 90 onto the socket assemblies 30.

Each operating part 60 has the operating gear 41 and a handle 411. The operating gear 41 is rotatably fixed on the upper surface of the first support plate 11. The handle 411 is a member configured to rotate integrally with the operating gear 41, and has such a form that the user using the nut temporary tightening device 1 can easily operate the nut temporary tightening device 1. The user carries the nut temporary tightening device 1 by grasping the handles 411. The user rotates the handles 411 clockwise and counter-clockwise.

The outline of the configuration of the nut temporary tightening device 1 has been described so far. In the following, an outline of how to operate the nut temporary tightening device 1 will be described. The user using the nut temporary tightening device 1 attracts the nuts 90 onto the sockets 33.

Next, the user moves the nut temporary tightening device 1 with the sockets 33 attracting the nuts 90, and, while pressing the sockets 33 against external threads (or bolts) of a workpiece on which the nuts 90 are to be temporarily tightened, rotates the socket assemblies 30 (clockwise if the threads are right-handed threads). After the nuts 90 have engaged with the external threads to some extent, the user lifts the nut temporary tightening device 1 to release the nuts 90.

The user performs this series of actions while holding each of the two handles 411. Since the nut temporary tightening device 1 has two operating parts 60, the user can perform these actions with both hands. When the user performs the series of actions while holding the nut temporary tightening device 1 with both hands, the risk that the user may drop the nut temporary tightening device 1 can be reduced compared with when the user performs the actions with one hand. Thus, the nut temporary tightening device 1 can enhance safety.

Further, when tightening the nuts 90 by the socket assemblies 30, the operation of tightening the nuts 90 is divided between the two operating parts 60, which can reduce the load on each operating part 60. Thus, the nut temporary tightening device 1 can increase the work efficiency.

Next, the arrangement of the gear group 40 and the driving gears 32 will be described with reference to FIG. 2. FIG. 2 is a layout plan of the gear group 40 in the nut temporary tightening device 1. The first support plate 11 has the operating gears 41 in a central part in the front-rear direction (Y-axis direction), respectively on the left side and the right side. Each operating gear 41 has an accompanying train of gears. The trains of gears of the respective operating gears 41 are disposed symmetrically in the left-right direction.

The operating gears 41 are each rotatably supported by an operating gear shaft 111 fixed on the first support plate 11. Each operating gear 41 meshes with a total of four first intermediate gears 42, two on a near side (Y-axis minus side) and the other two on a far side (Y-axis plus side).

Each first intermediate gear 42 has a first intermediate hole 420 and is rotatably supported by a first intermediate shaft 112 that is provided in the first intermediate hole 420 and fixed on the first support plate 11. A predetermined clearance is left between the first intermediate hole 420 and the first intermediate shaft 112. Therefore, the first intermediate gear 42 has play within such a range that the first intermediate gear 42 and a gear meshing with the first intermediate gear 42 remain meshing with each other. Each first intermediate gear 42 meshing with the operating gear 41 also meshes with the driving gear 32. Thus, the first intermediate gear 42 transmits the rotary force of the operating gear 41 to the driving gear 32.

Of the first intermediate gears 42 meshing with the operating gear 41, the two first intermediate gears 42 located on an inner side of the first support plate 11 each further mesh with the second intermediate gear 43. Each second intermediate gear 43 is rotatably supported by a second intermediate shaft 113 fixed on the first support plate 11. Further, on the inner side of each second intermediate gear 43, another first intermediate gear 42 meshes with the second intermediate gear 43. Thus, each second intermediate gear 43 meshes with two first intermediate gears 42. Between the first intermediate gear 42 that meshes with the operating gear 41 and the first intermediate gear 42 that does not mesh with the operating gear 41, each second intermediate gear 43 transmits the rotary force of the operating gear 41 to the first intermediate gear 42 that does not mesh with the operating gear 41.

The first intermediate gears 42 that mesh with the second intermediate gears 43 on the inner side of the second intermediate gears 43 respectively further mesh with the driving gears 32. To each of these driving gears 32, the rotary force of the operating gear 41 is transmitted through the first intermediate gear 42, the second intermediate gear 43, and another first intermediate gear 42.

Next, the rotation directions of the respective gears will be described. In FIG. 2, arrows indicating the rotation directions of the respective gears are indicated as one example. According to the example shown in FIG. 2, the operating gears 41 rotate clockwise. The first intermediate gears 42 that are connected to the operating gears 41 and follow the movement thereof rotate counterclockwise. The driving gears 32 that are connected to the first intermediate gears 42 and follow the movement thereof rotate clockwise. The first intermediate gears 42 that are connected to the second intermediate gears 43 and follow the movement thereof rotate counterclockwise. Further, the driving gears 32 that are connected to these first intermediate gears 42 and follow the movement thereof rotate clockwise.

In this configuration, each operating gear 41 transmits the rotary force to six driving gears 32. Further, in this configuration, the driving gears 32 of each operating gear 41 are linked to one another from the operating gear 41 at the same gear ratio. The six driving gears 32 accompanying each operating gear 41 are configured to rotate in the same direction at the same time. Thus, in the nut temporary tightening device 1, the operating gear 41 of each operating part 60 is connected to a plurality of intermediate gears (the first intermediate gears 42 and the second intermediate gears 43), and these intermediate gears are configured such that the driving gears 32 connected thereto rotate in the same direction and at the same speed. Thus, the nut temporary tightening device 1 allows nuts to be easily temporarily tightened onto a plurality of bolts by a single operation.

Next, the arrangement of the first support holes 110 and the driving gears 32 will be described. As shown in FIG. 2, the nut temporary tightening device 1 has a total of 12 driving gears 32. Of the 12 driving gears 32, six are disposed on the far side at intervals of a pitch P10 along a straight line L11 that extends in the left-right direction. Of the 12 driving gears 32, the other six are disposed on the near side at intervals of a pitch P10 along a straight line L12 that extends in the left-right direction.

In the nut temporary tightening device 1, the socket assemblies 30 are disposed according to the specifications of a workpiece to be worked on. The driving gears 32 correspond to the positions of the socket assemblies 30. According to the driving gears 32 thus disposed, the first support holes 110 are disposed in a linear arrangement on the far side and the near side of the first support plate 11.

The first support holes 110 include first reference holes 114 and first subordinate holes 115. The first reference holes 114 are round holes and each disposed in a third one, from the left, of the six first support holes 110 on the far side or the near side. The first reference holes 114 serve as reference holes. The diameter of the first reference holes 114 is set to be smaller than the diameter of the other first support holes 110, i.e., the long-side dimension of the first subordinate holes 115. The first support holes 110 other than the first reference holes 114 are first subordinate holes 115. The first subordinate holes 115 are elongated holes of which the long-side dimension is larger than the short-side dimension. The first subordinate holes 115 are disposed such that a long-side direction of each first subordinate hole 115 extends along the left-right direction in which the first support holes 110 are disposed.

The first reference holes 114 and the first subordinate holes 115 are thus disposed because the positions of external threads in a workpiece vary significantly in the left-right direction. One example of cases where the first support holes 110 are thus disposed such that the long-side direction extends in the left-right direction is a case where six parts that each have external threads at positions corresponding to the straight line L11 and the straight line L12 in the front-rear direction are coupled together in the left-right direction. In the case of such a workpiece, tolerances accumulate in the left-right direction, resulting in significant variation among the external threads in the left-right direction. in this case, the first reference holes 114 are set so as to be able to minimize the cumulative tolerance. Specifically, for example, the first support holes 110 corresponding to the driving gears 32 in a central part in the left-right direction are selected as the first reference holes 114.

For the driving gears 32 that are disposed on the left side and the right side of the first reference holes 114, the first subordinate holes 115 that are subordinate holes are disposed. When the first support holes 110 are elongated holes, the sleeves 21 can move in the left-right direction along the first subordinate holes 115. The nut temporary tightening device 1 absorbs variation among workpieces by this configuration. The dimension of the first subordinate holes 115 in the long-side direction is set, for example, such that the movable range is twice the maximum value of the tolerance of the positions of the external threads in the left-right direction.

The socket assemblies 30 passed through the first subordinate holes 115 move in the left-right direction. To appropriately transmit the rotary force of the operating gears 41 to the driving gears 32, a clearance is left between the first intermediate hole 420 of each first intermediate gear 42 and each first intermediate shaft 112.

The first support plate 11 has a positioning guide 116 near the first reference hole 114. The positioning guide 116 is a mark indicating that the nearby driving gear 32 serves as a reference. The positioning guide 116 is provided at such a position that the user can easily see it while operating the nut temporary tightening device 1. By having the positioning guide 116, the nut temporary tightening device 1 can increase the work efficiency.

Figure 3:
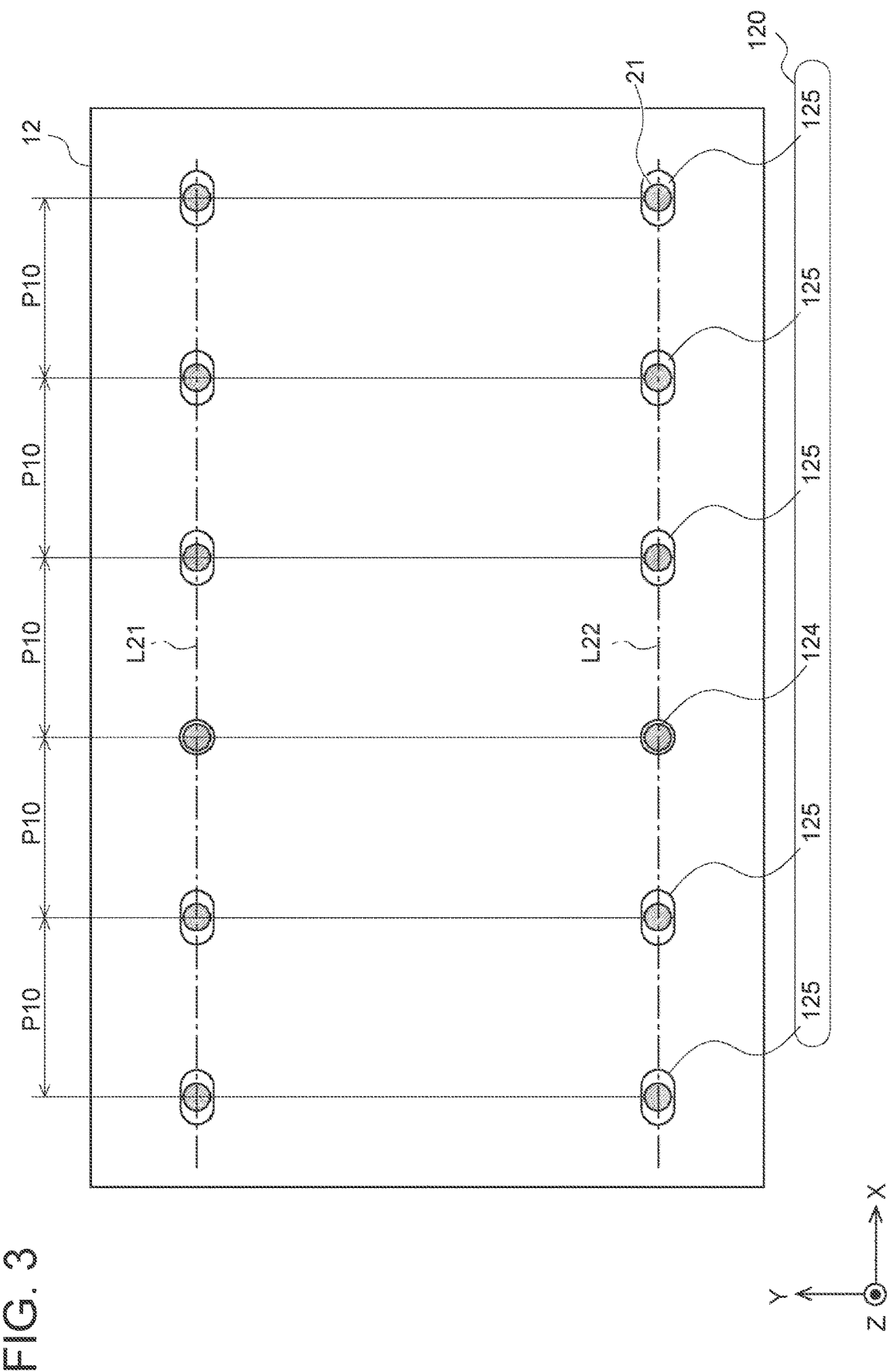
FIG. 3 is a plan view of a second support plate.

Next, the support holes of the second support plate 12 will be described with reference to FIG. 3. FIG. 3 is a plan view of the second support plate. The second support plate 12 is fixed under the first support plate 11 at a distance greater than the thickness of the flange so as to face and be parallel to the first support plate 11. The second support plate 12 has 12 second support holes 120 that each support the sleeve 21 of the corresponding bearing part 20 along the outer circumference, on the lower end side, of the bearing part 20.

Of the 12 second support holes 120, six are disposed on the far side at intervals of a pitch P10 along a straight line L21 that extends in the left-right direction. Of the 12 second support holes 120, the other six are disposed on the near side at intervals of a pitch P10 along a straight line L22 that extends in the left-right direction. The positions of these 12 second support holes 120 respectively correspond to the positions of the first support holes 110 shown in FIG. 2. Thus, in the second support plate 12, the second support holes 120 are disposed in a linear arrangement on the far side and the near side.

In the second support plate 12, the second support holes 120 include second reference holes 124 and second subordinate holes 125. The second reference holes 124 are round holes and each disposed in a third one, from the left, of the six second support holes 120 on the far side or the near side. The second reference holes 124 serve as reference holes. The diameter of the second reference holes 124 is set to be smaller than the diameter of the other second support holes 120, i.e., the long-side dimension of the second subordinate holes 125. The second support holes 120 other than the second reference holes 124 are second subordinate holes 125. The second subordinate holes 125 are elongated holes of which the long-side dimension is larger than the short-side dimension. The second subordinate holes 125 are disposed such that a long-side direction of each second subordinate hole 125 extends along the left-right direction in which the second support holes 120 are disposed.

Since the second support holes 120 are elongated holes corresponding to the first support holes 110, the sleeves 21 can move in the left-right direction along the second subordinate holes 125. The nut temporary tightening device 1 absorbs variation among workpieces by this configuration.

Figure 4:
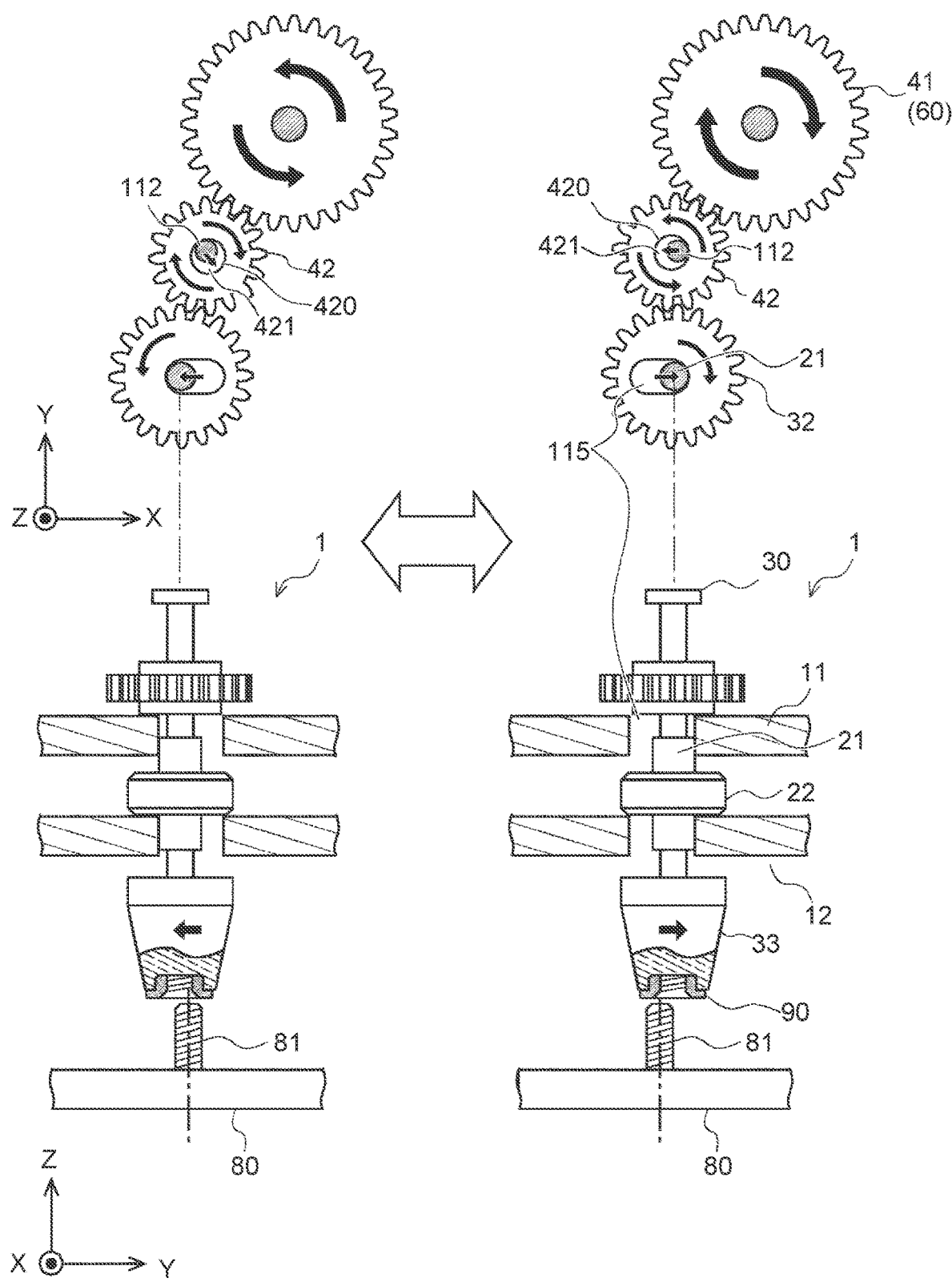
FIG. 4 is a view illustrating the movement of a train of gears and the movement of a socket assembly.

Next, the behaviors of the first intermediate gears 42 and the socket assemblies 30 will be described with reference to FIG. 4. FIG. 4 is a view illustrating the movement of a train of gears and the movement of the socket assembly. At the top of FIG. 4, a plan view extracting the operating gear 41, the first intermediate gear 42, and the driving gear 32 is shown. At the bottom of FIG. 4, a front view of the socket assemblies 30 corresponding to the plan view is shown. On the right side of FIG. 4, a state where the socket assembly 30 has moved toward the right side of the first subordinate hole 115 is shown. On the left side of FIG. 4, a state where the socket assembly 30 has moved toward the left side of the first subordinate hole 115 is shown.

First, the behavior of the socket assembly 30 will be described. On the right side of FIG. 4, the operating gear 41 rotates clockwise. Accordingly, the first intermediate gear 42 rotates counterclockwise. When the first intermediate gear 42 rotates counterclockwise, the driving gear 32 located on the near side of the first intermediate gear 42 is subjected to a rightward force due to meshing with the first intermediate gear 42. This causes the driving gear 32 to move rightward while rotating clockwise.

The socket assembly 30 shown at the bottom right of FIG. 4 has moved toward a right end of the first subordinate hole 115. The socket assembly 30 holds the nut 90 by the socket 33. A workpiece 80 is installed under the socket assembly 30. The workpiece 80 has a bolt 81 protruding upward. The nut 90 held by the socket assembly 30 that has moved to the right end of the first subordinate hole 115 is located on the right side relative to the center of the bolt 81.

On the left side of FIG. 4, the operating gear 41 rotates counterclockwise. Accordingly, the first intermediate gear 42 rotates clockwise. When the first intermediate gear 42 rotates clockwise, the driving gear 32 located on the near side of the first intermediate gear 42 is subjected to a leftward force due to meshing with the first intermediate gear 42. This causes the driving gear 32 to move leftward while rotating counterclockwise.

The socket assembly 30 shown at the bottom left of FIG. 4 has moved toward a left end of the first subordinate hole 115. The socket assembly 30 holds the nut 90 by the socket 33. The workpiece 80 is installed under the socket assembly 30. The workpiece 80 has a bolt 81 protruding upward. The nut 90 held by the socket assembly 30 that has moved to the left end of the first subordinate hole 115 is located on the left side relative to the center of the bolt 81.

Thus, the nut temporary tightening device 1 can move the position of the socket 33 leftward and rightward within the range of the first subordinate hole 115 while maintaining the relative positional relationship between the nut temporary tightening device 1 and the workpiece 80. The user moves the socket assemblies 30 by rotating the operating parts 60 clockwise or counterclockwise. By such an operation, the user aligns the nuts 90 with the positions of the bolts 81.

Next, the behavior of the first intermediate gears 42 will be described. There is a gap 421 between each first intermediate shaft 112 supporting the first intermediate gear 42 and the first intermediate hole 420 of the first intermediate gear 42. The position of the gap 421 changes depending on the direction of the force acting on the first intermediate gear 42.

On the right side of FIG. 4, the first intermediate gear 42 is subjected to a leftward force from the operating gear 41. As described above, the first intermediate gear 42 exerts a rightward force on the driving gear 32. Meanwhile, the first intermediate gear 42 is subjected to a leftward reaction force from the driving gear 32. This causes the first intermediate gear 42 to move leftward while rotating counterclockwise. As a result, the gap 421 is formed on the left side of the first intermediate shaft 112.

On the left side of FIG. 4, the first intermediate gear 42 is subjected to a force directed toward the right lower side from the operating gear 41. As described above, the first intermediate gear 42 exerts a leftward force on the driving gear 32. Meanwhile, the first intermediate gear 42 is subjected to a rightward reaction force from the driving gear 32. The gap 421 is formed on the right lower side of the first intermediate shaft 112. Therefore, the first intermediate gear 42 moves toward the right lower side while rotating clockwise.

As has been described above, each first intermediate gear 42 changes the positional relationship with the first intermediate shaft 112 or the position of the gap 421 according to the direction of the force exerted thereon by the operating gear 41 and the direction of the reaction force exerted thereon by the driving gear 32. Thus, each first intermediate gear 42 has the gap 421. When the driving gear 32 meshing with the first intermediate gear 42 moves based on the first support plate 11 and the second support plate 12, the gap 421 allows the first intermediate gear 42 to follow the driving gear 32 and mesh with the driving gear 32. Thus, the nut temporary tightening device 1 can adapt the sockets 33 to workpieces that vary significantly. As a result, the nut temporary tightening device 1 can increase the work efficiency.

Figure 5:
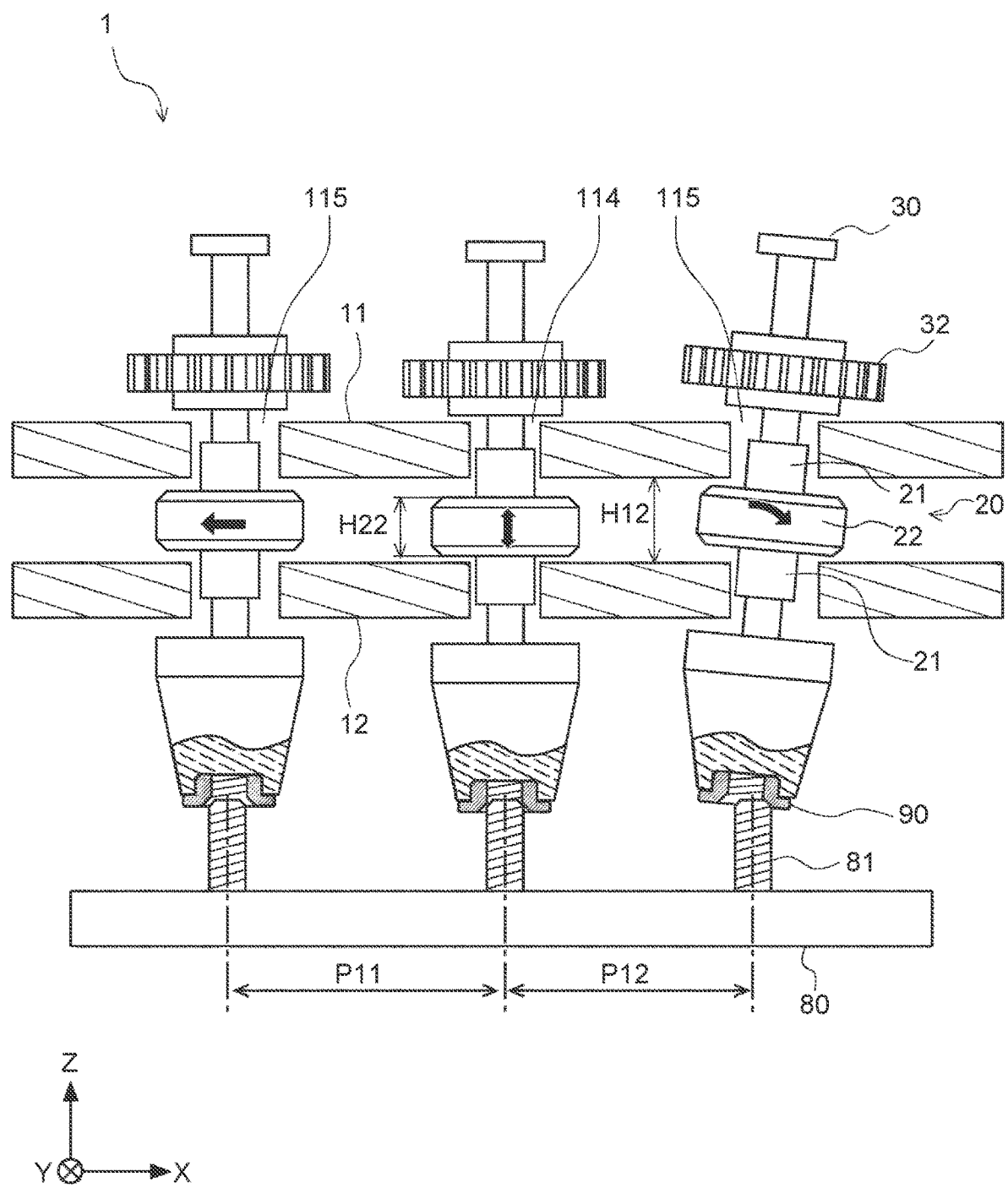
FIG. 5 is a view showing an example of the behaviors of bearing parts and socket assemblies.

Next, the behavior of the bearing parts 20 and the socket assemblies 30 will be further described with reference to FIG. 5. FIG. 5 is a view showing an example of the behaviors of the bearing parts 20 and the socket assemblies 30. In the nut temporary tightening device 1 shown in FIG. 5, the center socket assembly 30 serves as a reference.

The sleeve 21 of the center bearing part 20 is supported at an upper part thereof by the first support plate 11 without play and supported at a lower part thereof by the second support plate 12 without play. The flange 22 is located in a clearance formed between the first support plate 11 and the second support plate 12. Here, the clearance between the first support plate 11 and the second support plate 12 has a height H12, and the flange 22 has a height H22 that is shorter than the height H12. Therefore, the bearing part 20 is in a state of being loosely fitted so as to have play in the up-down direction.

Meanwhile, the left and right bearing parts 20 are each supported at an upper part thereof by the first support plate 11 with a predetermined clearance. Similarly, these bearing parts 20 are each supported at a lower part thereof by the second support plate 12 with a predetermined clearance. Therefore, these bearing parts 20 have play not only in the up-down direction but also in the left-right direction. Like the bearing part 20 shown on the right side, the bearing part 20 can also rotate around the Y-axis within the range of loose fitting.

In a state where the bearing parts 20 thus rotate, the driving gears 32 also rotate along with the bearing parts 20. In this state, the first intermediate gears 42, as they each have the gap 421 as described above, remain meshing with the driving gears 32 while avoiding a state where the gears stick to each other.

In FIG. 5, the nut temporary tightening device 1 is trying to fit the nuts 90 onto the workpiece 80. The distance between the bolts 81 varies. A distance P11 between the left bolt 81 and the center bolt 81 is slightly longer than the pitch P10 of the socket assemblies 30 shown in FIG. 2. A distance P12 between the right bolt 81 and the center bolt 81 is slightly shorter than the pitch P10 of the socket assemblies 30 shown in FIG. 2.

In this situation, the center socket assembly 30 coincides with the bolt 81 in the left-right direction. Meanwhile, the left socket assembly 30 has moved leftward within the range of the first subordinate hole 115. By having moved leftward, the socket assembly 30 is located at a position at which the nut 90 can be fitted. By rotating around the Y-axis, the right socket assembly 30 has a guiding portion of the nut 90 fitted on the bolt 81. Thus, when the bolts 81 on which the nuts 90 are to be temporarily tightened vary in the position, the nut temporary tightening device 1 can absorb this variation and fit the nuts 90.

Figure 6:
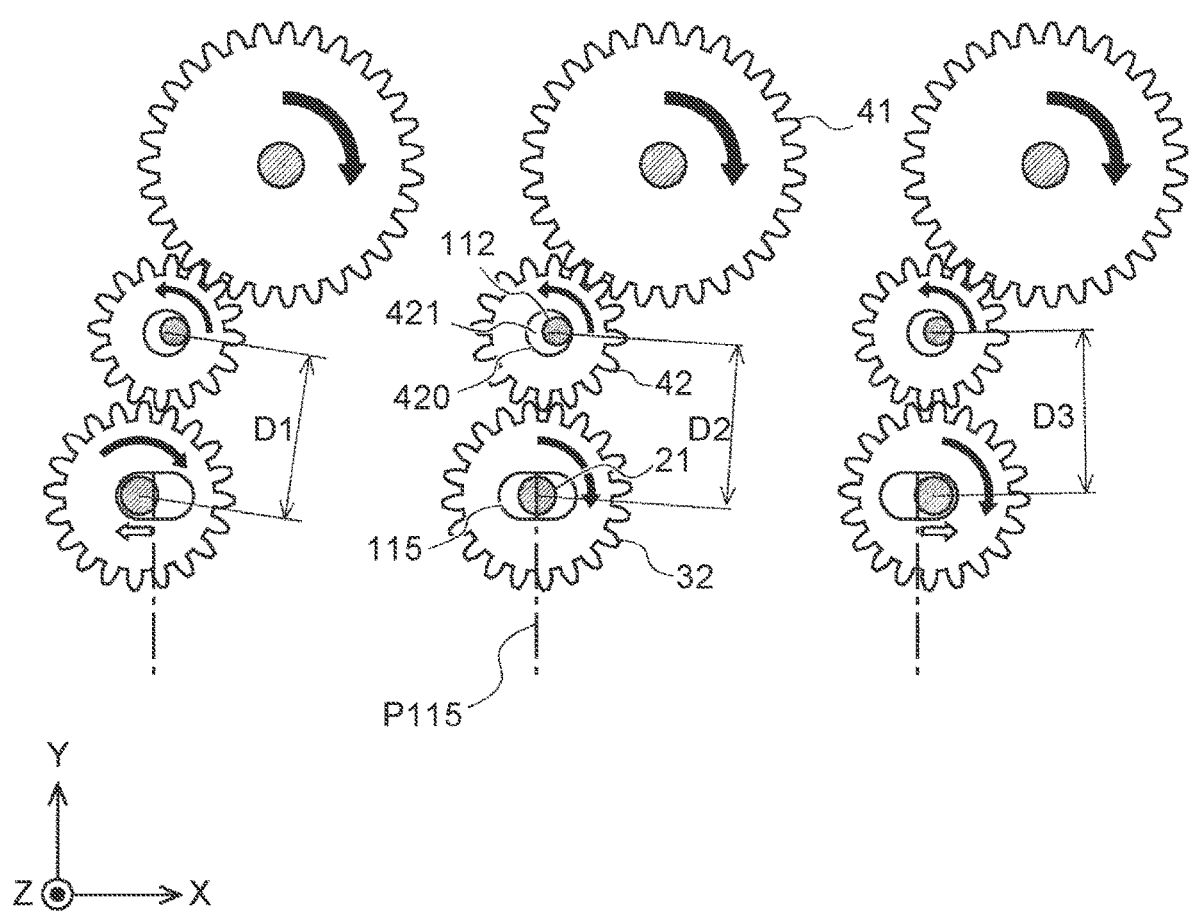
FIG. 6 is a view illustrating the movement of intermediate gears and driving gears.

Next, the positions of the first intermediate gears 42 and the driving gears 32 when temporarily tightening the nuts 90 will be described with reference to FIG. 6. FIG. 6 is a view illustrating the movement of the intermediate gears and the driving gears. In FIG. 6, three top views each extracting a train of gears composed of the operating gear 41, the first intermediate gear 42, and the driving gear 32 are arrayed in the left-right direction. A centerline P115 is indicated at the center of each first subordinate hole 115 in the left-right direction. In the left train of gears, the driving gear 32 is located at the left end of the first subordinate hole 115. In the center train of gears, the driving gear 32 is located at the center of the first subordinate hole 115. In the right train of gears, the driving gear 32 is located at the right end of the first subordinate hole 115.

In this situation, the nut temporary tightening device 1 temporarily tightens the nuts 90. When temporarily tightening the nuts 90 having right-handed threads, the nut temporary tightening device 1 rotates the first intermediate gears 42 clockwise. In this case, in each case of FIG. 6, the first intermediate gear 42 moves leftward under the force exerted thereon by the operating gear 41 and the reaction force of the driving gear 32 so as to form the gap 421 on the left side. Thus, the first intermediate gear 42 is configured to be able to transmit rotary force from the first intermediate gear 42 regardless of whether the driving gear 32 is located on the left side or the right side within the range of the first subordinate hole 115.

Specifically, as shown on the left side of FIG. 6, in the state where the driving gear 32 has moved to the left end of the first subordinate hole 115, the center distance between the first intermediate gear 42 and the driving gear 32 is a distance D1. In the state where the driving gear 32 has moved to the center of the first subordinate hole 115, the center distance between the first intermediate gear 42 and the driving gear 32 is a distance D2 that is shorter than the distance D1. In the state where the driving gear 32 has moved to the right end of the first subordinate hole 115, the center distance between the first intermediate gear 42 and the driving gear 32 is a distance D3 that is shorter than the distance D2. The first intermediate gear 42 is configured to be able to transmit rotary force to the driving gear 32 in all these cases. Here, for example, the first intermediate gear 42 and the driving gear 32 meshing with each other may be separated from each other to such an extent that about quarter portions of the gear teeth mesh with each other.

The center distance between the first intermediate gear 42 and the driving gear 32 varies depending on the position of the sleeve 21 in the first subordinate hole 115, and at which position the distance becomes longest and at which position the distance becomes shortest depend on the arrangement of the train of gears. Therefore, the position of the first intermediate shaft 112 and the form of the gap 421 are set according to the arrangement of the individual gears.

Embodiment 1 has been described so far. The nut temporary tightening device 1 according to Embodiment 1 can absorb dimensional variation among workpieces and temporarily tighten a plurality of nuts at the same time.

The nut temporary tightening device 1 according to Embodiment 1 is not limited to the above-described configuration. The number of the socket assemblies 30 provided in the nut temporary tightening device 1 can be flexibly changed according to the form of the workpiece. The first support holes 110 of the first support plate 11 may not include the first reference holes 114 and all the first support holes 110 may have the same shape. All the first support holes 110 may be round holes.

As has been described above, this embodiment can provide a nut temporary tightening device that can absorb variation in shaft pitch and temporarily tighten a plurality of nuts at the same time.

Embodiment 2

Next, Embodiment 2 will be described. Embodiment 2 is different from Embodiment 1 in that the positions in the up-down direction of the socket assemblies 30 inserted into the first reference holes 114 and the positions in the up-down direction of the socket assemblies 30 inserted into the first subordinate holes 115 are set to be different from each other.

Figure 7:
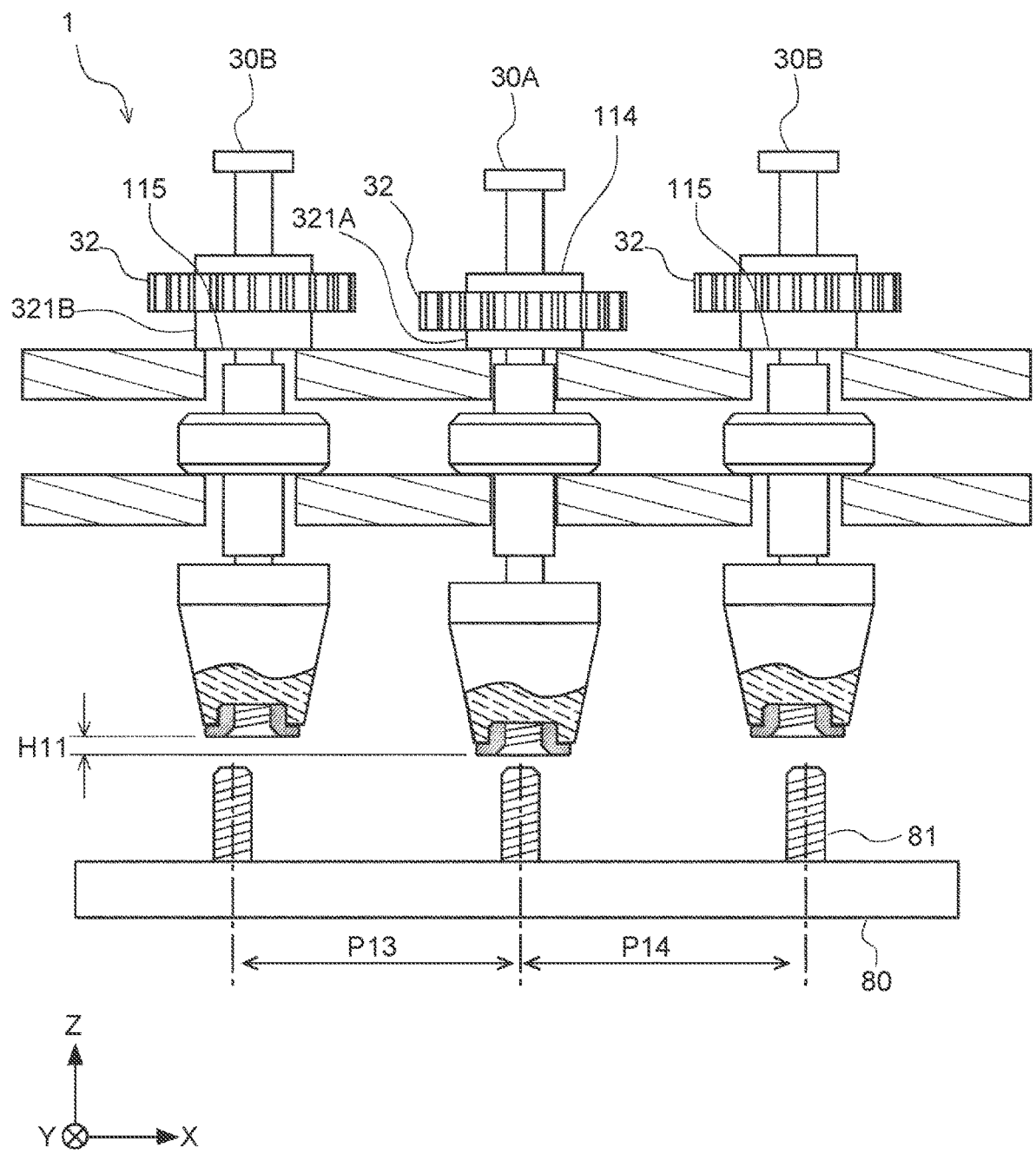
FIG. 7 is a first view showing the movement of socket assemblies according to Embodiment 2.

FIG. 7 is a first view showing the movement of the socket assemblies according to Embodiment 2. To help understanding, three socket assemblies 30 of the nut temporary tightening device 1 will be shown as representatives in the following description.

The nut temporary tightening device 1 shown in FIG. 7 has a socket assembly 30A and socket assemblies 30B. The socket assembly 30A is provided in the first reference hole 114. Therefore, the socket assembly 30A may be referred to as a reference socket assembly. The socket 33 of the socket assembly 30A may be referred to as a reference socket.

The socket assembly 30A has a spacer 321A under the driving gear 32. The spacer 321A is set so as to contact the upper surface of the first support plate 11 when the socket assembly 30A is relatively lowered in the nut temporary tightening device 1. The socket assemblies 30B are provided in the first subordinate holes 115. Each socket assembly 30B has a spacer 321B under the driving gear 32. The spacer 321B is set so as to contact the upper surface of the first support plate 11 when the socket assembly 30B is relatively lowered in the nut temporary tightening device 1.

In this configuration, the height of the spacer 321A is set to be shorter than the height of the spacer 321B. Therefore, in a state where the user has lifted the nut temporary tightening device 1, the level of the socket 33 of the socket assembly 30A is lower than the levels of the sockets 33 of the socket assemblies 30B by a height of H11.

The state shown in FIG. 7 is that at time T=T11. The user is moving the nut temporary tightening device 1 with the nuts 90 attracted thereon toward the workpiece 80. In FIG. 7, the distance between the left bolt 81 and the center bolt 81 is a pitch P13 and the distance between the center bolt 81 and the right bolt 81 is a pitch P14, both slightly longer than the pitch P10 shown in FIG. 2. The user moves the nut temporary tightening device 1 further downward to align the position of the center socket assembly 30A with the center bolt 81.

Figure 8:
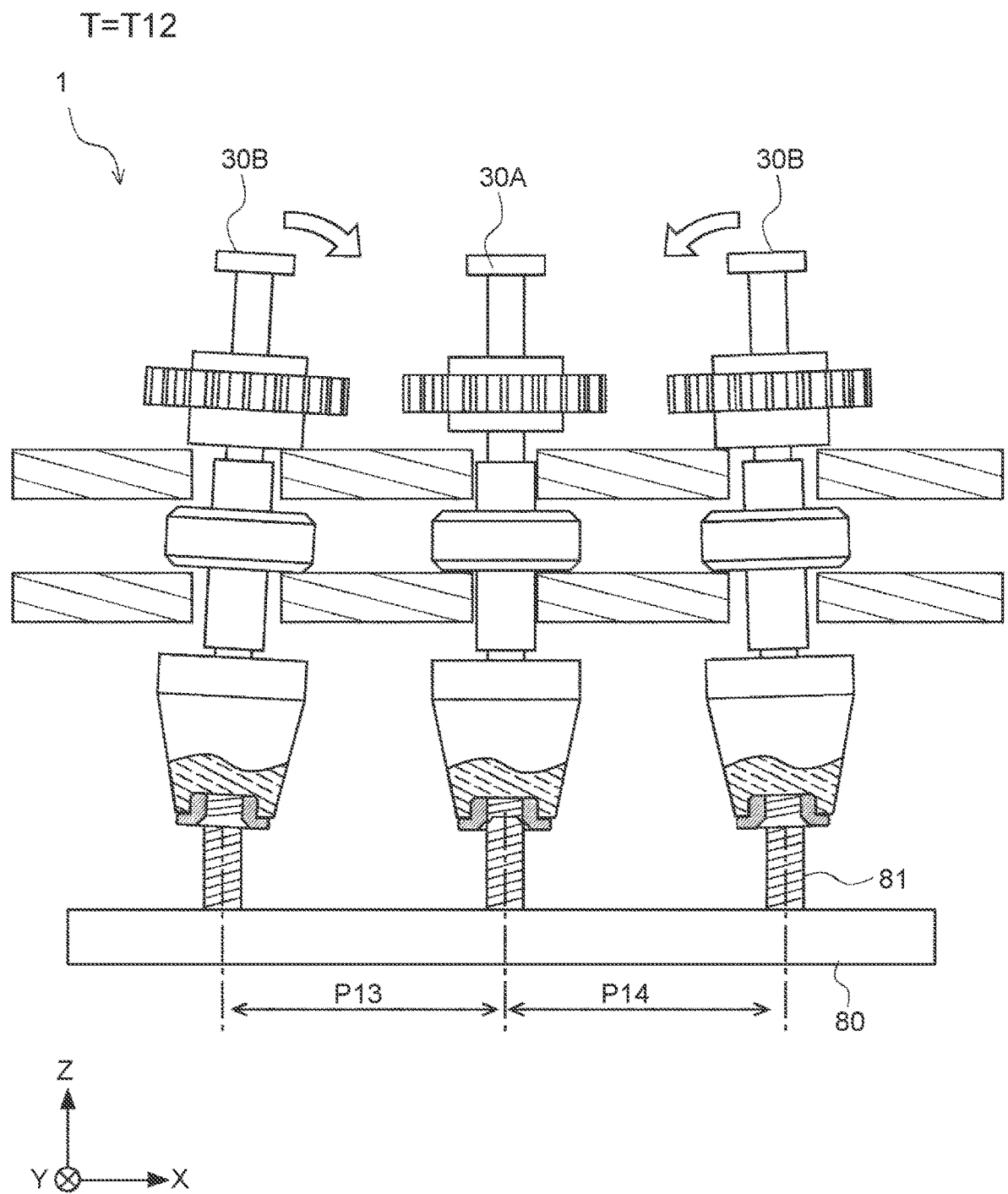
FIG. 8 is a second view showing the movement of the socket assemblies according to Embodiment 2.

FIG. 8 is a second view showing the movement of the socket assemblies according to Embodiment 2. FIG. 8 shows a state of the nut temporary tightening device 1 at time T12 after time T11. In FIG. 8, the socket assembly 30A has a thread of the nut 90 in contact with the tip of the bolt 81. Also after the nut 90 contacts the tip of the bolt 81, the user moves the nut temporary tightening device 1 downward. Then, in the left and right socket assemblies 30B, guiding portions of the nuts 90 and guiding portions of the bolts 81 contact each other. The left and right socket assemblies 30B each incline toward the inner side. The user starts to rotate the operating gears 41 in this state.

Figure 9:
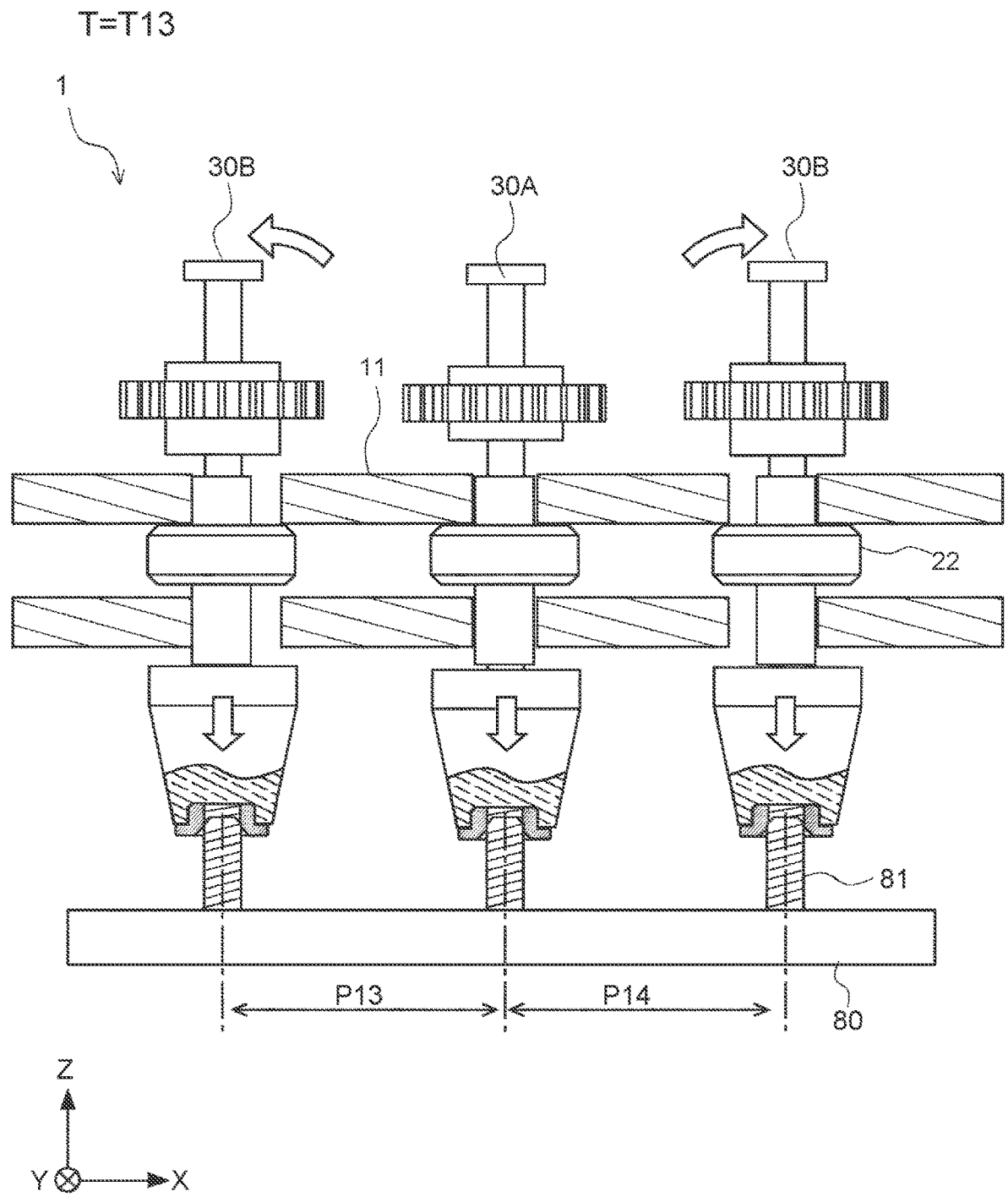
FIG. 9 is a third view showing the movement of the socket assemblies according to Embodiment 2.

FIG. 9 is a third view showing the movement of the socket assemblies according to Embodiment 2. FIG. 9 shows a state of the nut temporary tightening device 1 at time T13 after time T12. FIG. 9 shows a state where the user has rotated the operating gears 41 to engage the nuts 90 and the bolts 81 with each other. When the nut 90 and the bolt 81 are engaged with each other, an upper surface of the flange 22 and a lower surface of the first support plate 11 contact each other in the left and right socket assemblies 30B that have inclined toward the inner side. As a result, the socket assemblies 30B assume a perpendicular posture.

The nut temporary tightening device 1 according to Embodiment 2 has been described so far. In the nut temporary tightening device 1 according to this embodiment, the socket assembly 30A set in the first reference hole 114 first contacts the bolt 81, which makes positioning easier. Thus, the nut temporary tightening device 1 according to this embodiment can increase the work efficiency.

As has been described above, this embodiment can provide a nut temporary tightening device that can absorb variation in shaft pitch and temporarily tighten a plurality of nuts at the same time.

Embodiment 3

Next, Embodiment 3 will be described. Embodiment 3 is different from the above-described embodiments in that the position in the up-down direction of the socket assembly 30 inserted into the first reference hole 114 and the positions in the up-down direction of the socket assemblies 30 inserted into the first subordinate holes 115 are set to be different from each other.

Figure 10:
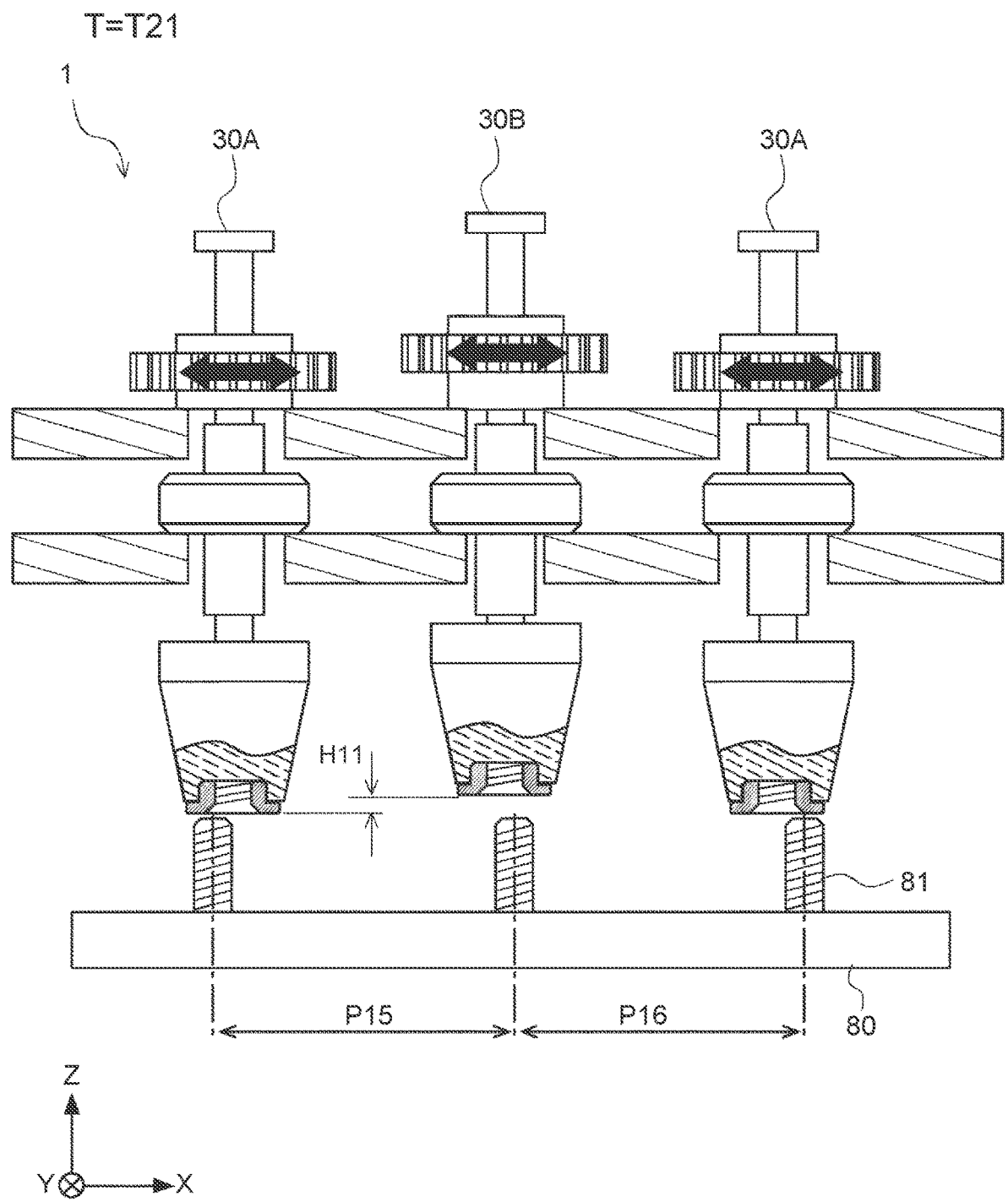
FIG. 10 is a first view showing the movement of socket assemblies according to Embodiment 3.

FIG. 10 is a first view showing the movement of the socket assemblies according to Embodiment 3. The nut temporary tightening device 1 shown in FIG. 10 has socket assemblies 30A and a socket assembly 30B. The socket assembly 30B is provided in the first reference hole 114. In this embodiment, the socket assembly 30B may be referred to as a reference socket assembly. The socket 33 of the socket assembly 30B may be referred to as a reference socket.

The socket assemblies 30A are provided in the first subordinate holes 115. Therefore, in a state where the user has lifted the nut temporary tightening device 1, the level of the sockets 33 of the socket assemblies 30A is lower than the level of the socket 33 of the socket assembly 30B by a height of H11.

The state shown in FIG. 10 is that at time T=T21. The user is moving the nut temporary tightening device 1 with the nuts 90 attracted thereon toward the workpiece 80. In FIG. 10, the distance between the left bolt 81 and the center bolt 81 is a pitch P15 and the distance between the center bolt 81 and the right bolt 81 is a pitch P16, both even longer than the pitches shown in FIG. 7. Therefore, the user cannot fit the nuts 90 onto the bolts 81 by moving the nut temporary tightening device 1 straight downward. Then, in the position of FIG. 10, the user rotates the handles 411 clockwise and counterclockwise so as to move the socket assemblies 30A and the socket assembly 30B leftward and rightward. Thus, the user can align the nuts 90 with the bolts 81.

Figure 11:
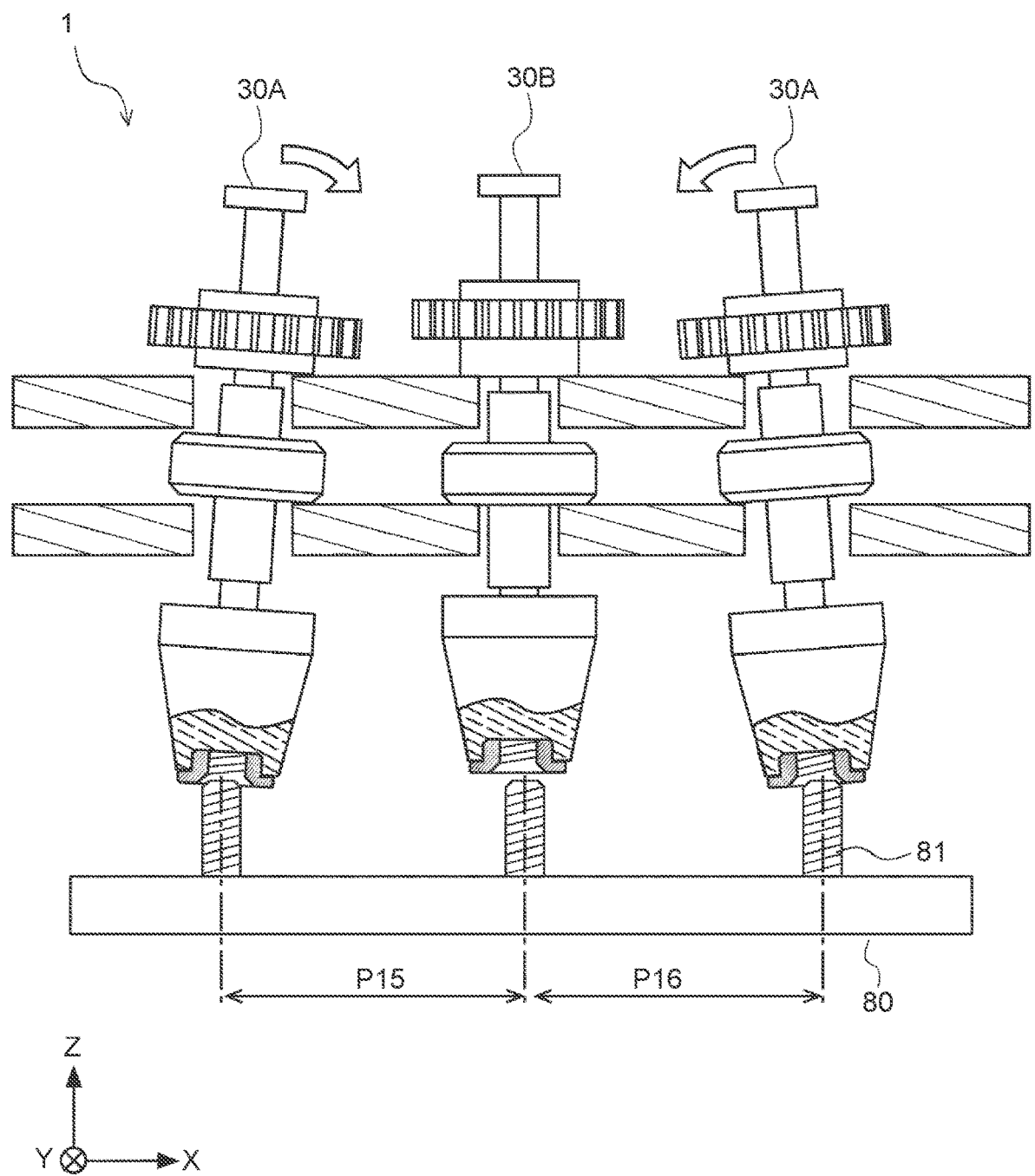
FIG. 11 is a second view showing the movement of the socket assemblies according to Embodiment 3.

FIG. 11 is a second view showing the movement of the socket assemblies according to Embodiment 3. FIG. 11 shows a state of the nut temporary tightening device 1 at time T22 after time T21. In FIG. 11, the left and right socket assemblies 30A have threads of the nuts 90 in contact with tips of the bolts 81. Also after the nuts 90 and the tips of the bolts 81 contact each other, the user moves the nut temporary tightening device 1 downward. Then, in the center socket assembly 30B, a guiding portion of the nut 90 and a guiding portion of the bolt 81 contact each other. The left and right socket assemblies 30B each incline toward the inner side. In this state, the user starts to rotate the operating gears 41.

Figure 12:
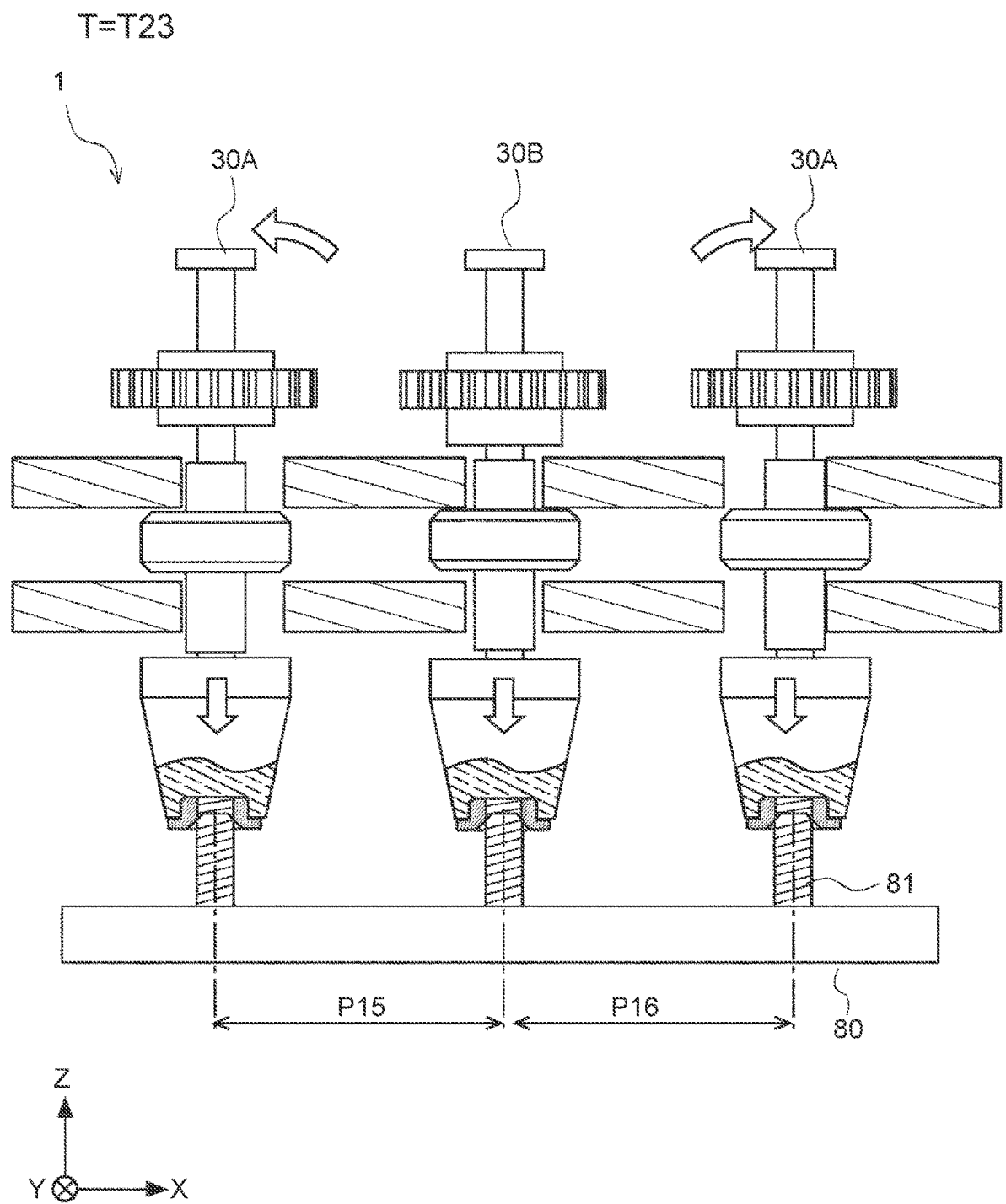
FIG. 12 is a third view showing the movement of the socket assemblies according to Embodiment 3.

FIG. 12 is a third view showing the movement of the socket assemblies according to Embodiment 3. FIG. 13 shows a state of the nut temporary tightening device 1 at time T23 after time T22. FIG. 13 shows a state where the user has rotated the operating gears 41 to engage the nuts 90 and the bolts 81 with each other. When the nut 90 and the bolt 81 are engaged with each other, an upper surface of the flange 22 and the lower surface of the first support plate 11 contact each other in the left and right socket assemblies 30A that have inclined toward the inner side. As a result, the socket assemblies 30A assume a perpendicular posture.

The nut temporary tightening device 1 according to Embodiment 3 has been described so far. In the nut temporary tightening device 1 according to this embodiment, the nuts 90 and the bolts 81 are brought into contact with each other while the socket assemblies 30A set in the first subordinate holes 115 are moved leftward and rightward, which makes positioning easier. Thus, the nut temporary tightening device 1 according to this embodiment can increase the work efficiency.

As has been described above, this embodiment can provide a nut temporary tightening device that can absorb variation in shaft pitch and temporarily tighten a plurality of nuts at the same time.

As has been described above, this embodiment can provide a nut temporary tightening device that can absorb variation in shaft pitch and temporarily tighten a plurality of nuts at the same time.

The disclosure is not limited to the above-described embodiments but can be changed as necessary within the scope of the gist of the disclosure.

What is claimed is:

1. A nut temporary tightening device comprising:
    bearing parts each having a cylindrical sleeve extending in an up-down direction and a flange provided at an intermediate portion of the cylindrical sleeve;
    a first support plate having a plurality of first support holes that each support corresponding one of the bearing parts along an outer circumference, on an upper end side, of the bearing part;
    a second support plate that is fixed under the first support plate at a distance greater than a thickness of the flange such that the second support plate faces and is parallel to the first support plate, and has a plurality of second support holes that each support corresponding one of the bearing parts along the outer circumference, on a lower end side, of the bearing part; and
    socket assemblies each having a driving shaft that is passed through corresponding one of the bearing parts that is supported such that the flange is loosely fitted in the up-down direction between the first support plate and the second support plate, a driving gear that is provided at a portion of the driving shaft protruding toward the upper end side, and a socket that is provided to be able to hold a nut at a leading end of the driving shaft protruding toward the lower end side, wherein
    the first support holes of the first support plate are disposed in a linear arrangement,
    the second support holes of the second support plate are disposed in a linear arrangement at positions corresponding to the first support holes,
    the first support plate has elongated holes as the first support holes, and a long-side direction of each of the elongated holes extends along a direction in which the first support holes are disposed,
    the second support plate has elongated holes corresponding to the first support holes as the second support holes, and
    at least one pair of corresponding holes of the first support holes and the second support holes of the first support plate and the second support plate is reference holes, and a diameter of the reference holes is set to be smaller than a diameter of the other first support holes or a diameter of the other second support holes.

2. The nut temporary tightening device according to claim 1, wherein the socket belonging to at least one socket assembly among the socket assemblies is a reference socket, and a position of the reference socket in the up-down direction is set to be different from positions of the other sockets.

3. The nut temporary tightening device according to claim 1, further comprising:
    an operating part that has an operating gear and a handle above the operating gear and is rotatably fixed on an upper surface of the first support plate; and
    intermediate gears that are rotatably fixed on the upper surface of the first support plate and transmit rotation of the operating gear to the socket assemblies, wherein:
    the driving gear is provided on an outer circumference of the driving shaft and meshes with the intermediate gear; and
    the operating gear of the operating part is connected to the intermediate gears, and the intermediate gears are configured such that the driving gears rotate in the same direction and at the same speed.

4. The nut temporary tightening device according to claim 3, wherein the intermediate gears each have a gap such that when the driving gear meshing with the intermediate gear moves based on the first support hole and the second support hole, the intermediate gear is able to follow the driving gear and mesh with the driving gear.

5. The nut temporary tightening device according to claim 1, wherein the diameter of the reference holes is set to be smaller than the diameter of the other first support holes.

6. The nut temporary tightening device according to claim 1, wherein the diameter of the reference holes is set to be smaller than the diameter of the other second support holes.

* * * * *